United States Patent
Nicholls et al.

(10) Patent No.: US 7,194,050 B2
(45) Date of Patent: Mar. 20, 2007

(54) REDUCING NARROWBAND INTERFERENCE IN A WIDEBAND SIGNAL

(75) Inventors: Charles T. Nicholls, Nepean (CA); Gregory C. Carleton, Ottawa (CA); Adrian J. Bergsma, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1110 days.

(21) Appl. No.: 10/259,891

(22) Filed: Sep. 30, 2002

(65) Prior Publication Data
US 2004/0062216 A1 Apr. 1, 2004

(51) Int. Cl.
*H03D 1/04* (2006.01)
(52) U.S. Cl. ...................................... 375/346
(58) Field of Classification Search ................ 375/346, 375/350, 254, 285, 278, 284
See application file for complete search history.

(56) References Cited

U.S. PATENT DOCUMENTS 4,907,293 A * 3/1990 Ueno .......................... 455/295
5,307,515 A * 4/1994 Kuo et al. .................... 455/295
5,423,064 A * 6/1995 Sakata ......................... 455/437
5,519,887 A * 5/1996 Lieu ............................ 455/266

FOREIGN PATENT DOCUMENTS

| EP | 0812069 | 4/1997 |
|----|---------|--------|
| WO | 0046929 | 2/1999 |
| WO | 0150622 | 12/2000 |
| WO | 0178242 | 6/2001 |

* cited by examiner

*Primary Examiner*—Emmanuel Bayard

(57) ABSTRACT

Narrowband interference in a wideband RF signal is reduced by a notch filter operating at IF between down- and up-converters supplied by a local oscillator (LO) at a frequency controlled by a control circuit. The control circuit detects interference by determining power in each of a plurality of narrowband channels, also at IF via another down-converter with a controlled LO frequency, relative to power of the wideband RF signal and scaled in accordance with the wideband and narrowband bandwidths. The control circuit controls the LOs for scanning the narrowband channels to determine a channel with greatest interference and to filter out this narrowband channel with the notch filter. In the absence of interference, the notch is tuned outside the signal bandwidth.

19 Claims, 2 Drawing Sheets

REDUCING NARROWBAND INTERFERENCE IN A WIDEBAND SIGNAL

This invention relates to reducing narrowband interference in a wideband signal, for example a radio frequency (RF) signal of a CDMA (Code Division Multiple Access) wireless communications system.

BACKGROUND

With increasing deployment of relatively wideband communications systems, for example CDMA wireless systems with a bandwidth of for example 1.28 MHz, it has been recognized that relatively narrowband interference at frequencies within the wideband spectrum can present a significant problem. For example, such narrowband interference can arise from other communications systems, such as AMPS (Analog Mobile Phone System) communications systems in adjacent areas especially near cell boundaries of the CDMA systems, and narrowband FM (frequency modulation) communications systems, each with a channel bandwidth of for example 30 kHz.

Although attempts are typically made to avoid such interference, for example by allocating frequency spectrum use for different systems in different areas, such interference can still occur and can have serious adverse effects on the performance and operation of the CDMA wireless systems. Similar problems can also arise due to other narrowband interference with CDMA wireless or other wideband communications systems.

International Patent Publication No. WO 00/46929 published Aug. 10, 2000, Lockheed Martin Canada (Charles E. Jagger et al.), entitled "Maintaining Performance Quality Of Broadband System In The Presence Of Narrow Band Interference" describes an adaptive notch filter (ANF) arrangement using one or more notch filters included in a receive signal path of a CDMA wireless system to filter out detected narrowband interference at one or more frequencies.

In this arrangement, an RF signal on the receive path is down-converted using a frequency-controlled local oscillator (LO) signal to an IF (intermediate frequency), notch filtered, and up-converted back to an RF signal, the LO frequency being determined by the narrowband interference frequency to be filtered. The narrowband interference is detected by an FM receiver responsive to the IF signal to produce a RSSI (received signal strength indication) signal for the narrow frequency band, this RSSI signal being compared with a threshold. Instead of providing an FM receiver for each notch filter, a modification of the arrangement uses a scanning FM receiver, and the threshold can be an adaptive threshold determined by adding a constant offset or increment to an average composite power or signal level determined from stored RSSI signals obtained while tuning the FM receiver through the CDMA band.

This arrangement has a disadvantage of involving the complexity and costs of an FM receiver for each notch filter, or a scanning FM receiver for a plurality of notch filters. Also, the arrangement is only effective for FM interference, so that narrowband interference which is not FM is not filtered out. In addition, a bypass switch is required for each notch filter, to bypass the respective notch filter in the event that it is not required to filter out any narrowband interference.

Accordingly, there is a need to provide an improved arrangement and method for detecting and reducing narrowband interference in a wideband signal.

SUMMARY OF THE INVENTION

According to one aspect of this invention there is provided an arrangement for reducing narrowband interference in a wideband signal, comprising: a first power detector for producing a first power signal representing power of the wideband signal over a bandwidth of the wideband signal; a selector for selecting any one of a plurality of narrowband parts of the wideband signal; a second power detector for producing a second power signal representing power of a narrowband part of the wideband signal selected by the selector; a filter for filtering the wideband signal to remove therefrom a selected narrowband part of the wideband signal; and a control circuit responsive to the first and second power signals, scaled in accordance with the wideband and narrowband bandwidths, to detect interference in the narrowband part of the wideband signal selected by the selector and, in response to such detection, to control the filter to select said narrowband part of the wideband signal selected by the selector thereby to reduce said interference.

The selector can comprise a narrowband filter for selecting any one of a plurality of narrowband parts of the wideband signal under the control of the control circuit. Preferably, the selector comprises a local oscillator (LO) controlled by the control circuit to produce an LO signal at any one of a plurality of frequencies, a mixer responsive to the wideband signal and the LO signal to produce a frequency difference signal, and a narrowband filter for filtering the frequency difference signal.

The filter for filtering the wideband signal to remove therefrom a selected narrowband part of the wideband signal preferably comprises a second LO controlled by the control circuit to produce a second LO signal at any one of a plurality of frequencies, a second mixer responsive to the wideband signal and the second LO signal to produce a second frequency difference signal, and a notch filter for filtering the second frequency difference signal to remove therefrom a selected narrowband part of the second frequency difference signal thereby to produce a notch filtered signal. The filter for filtering the wideband signal can further comprise a third mixer responsive to the notch filtered signal and the second LO signal to produce a frequency sum signal constituting the wideband signal with reduced narrowband interference.

Conveniently each of the LOs comprises a phase locked loop including a frequency divider having a frequency division factor controlled by the control circuit.

The arrangement can include a wideband filter, having a pass band corresponding to the bandwidth of the wideband signal, via which the wideband signal is coupled to the first power detector. The arrangement can further comprise a third LO, for producing a third LO signal at a predetermined frequency, and a further mixer responsive to the wideband signal and the third LO signal to produce a third frequency difference signal, the wideband filter being arranged for filtering the third frequency difference signal.

Preferably the control circuit is responsive to the first and second power signals to control the second LO, in the absence of detected interference in any of said plurality of narrowband parts of the wideband signal, so that the notch filter filters a narrowband part of the second frequency difference signal outside a frequency band of the second frequency difference signal corresponding to the wideband signal. Consequently, it is not necessary to provide bypass switches which would otherwise be required for bypassing the wideband signal around the notch filter in the absence of any narrowband interference to be removed.

According to another aspect, this invention provides apparatus for reducing narrowband interference in a wideband radio frequency (RF) signal of a CDMA communications system, comprising: a notch filter unit comprising a first downconverter for converting the RF signal to an intermediate frequency (IF) signal, a notch filter for filtering to remove a narrowband part of the IF signal, and an up-converter for converting the filtered IF signal to an RF signal; a control circuit; a first local oscillator (LO) for supplying to the first down-converter and to the up-converter of the notch filter unit a LO signal having a frequency controlled by the control circuit so that said narrowband part of the IF signal removed by the notch filter corresponds to any one of a plurality of narrowband channels within a bandwidth of the RF signal; and a second down-converter, a second local oscillator controlled by the control circuit, and a narrowband filter for producing from the RF signal an IF signal having a narrow bandwidth corresponding to any one of said plurality of narrowband channels; wherein the control circuit includes a power detector for determining power of said IF signal having a narrow bandwidth, the control circuit being responsive to the determined power of said IF signal, relative to a determined power of the wideband RF signal and scaled in accordance with the wideband and narrowband bandwidths of said signals, to detect narrowband interference in the wideband RF signal and, in response to such detection, to control the first LO so that the narrowband part of the wideband signal removed by the notch filter contains said interference.

This apparatus can include a third down-converter, a third local oscillator, and a wideband filter for producing from the RF signal an IF signal having a wide bandwidth corresponding to the bandwidth of the RF signal; and a second power detector for determining power of said IF signal having a wide bandwidth thereby to determine the power of the wideband RF signal.

The apparatus can include a plurality of said notch filter units coupled in cascade, and a plurality of said first LOs each associated with a respective one of the notch filter units, each of the plurality of said first LOs being controlled by the control circuit so that the associated notch filter unit can filter a respective one of said plurality of narrowband channels within the bandwidth of the RF signal.

Advantageously in this apparatus the control circuit is responsive to an absence of detected narrowband interference in the wideband RF signal to control the first LO so that the narrowband part of the wideband signal removed by the notch filter is outside a bandwidth of the IF signal corresponding to said wideband bandwidth of the RF signal.

A further aspect of the invention provides a method of detecting and reducing narrowband interference in a wideband signal, comprising the steps of: for each of a plurality of narrowband channels within a bandwidth of the wideband signal, determining a power of the signal within the narrowband channel relative to a power of the wideband signal, scaled in accordance with the wideband and narrowband bandwidths, and comparing the determined power with a threshold thereby to detect interference in the narrowband channel; decreasing the threshold from a relatively high level thereby to determine a narrowband channel having a greatest interference; and filtering the determined narrowband channel having the greatest interference from the wideband signal thereby to reduce said interference in the wideband signal.

The wideband signal can be a radio frequency (RF) signal, the method further comprising the step of down-converting the wideband signal to an intermediate frequency (IF) for the steps of determining power and filtering.

Preferably, in response to the threshold being decreased to a lower limit before detection of said narrowband channel having a greatest interference, the step of filtering comprises filtering from the wideband signal a narrowband channel outside the bandwidth of the wideband signal.

BRIEF DESCRIPTION OF THE DRAWINGS

The invention will be further understood from the following description by way of example with reference to the accompanying drawings, in which.

DETAILED DESCRIPTION

Figure 1:
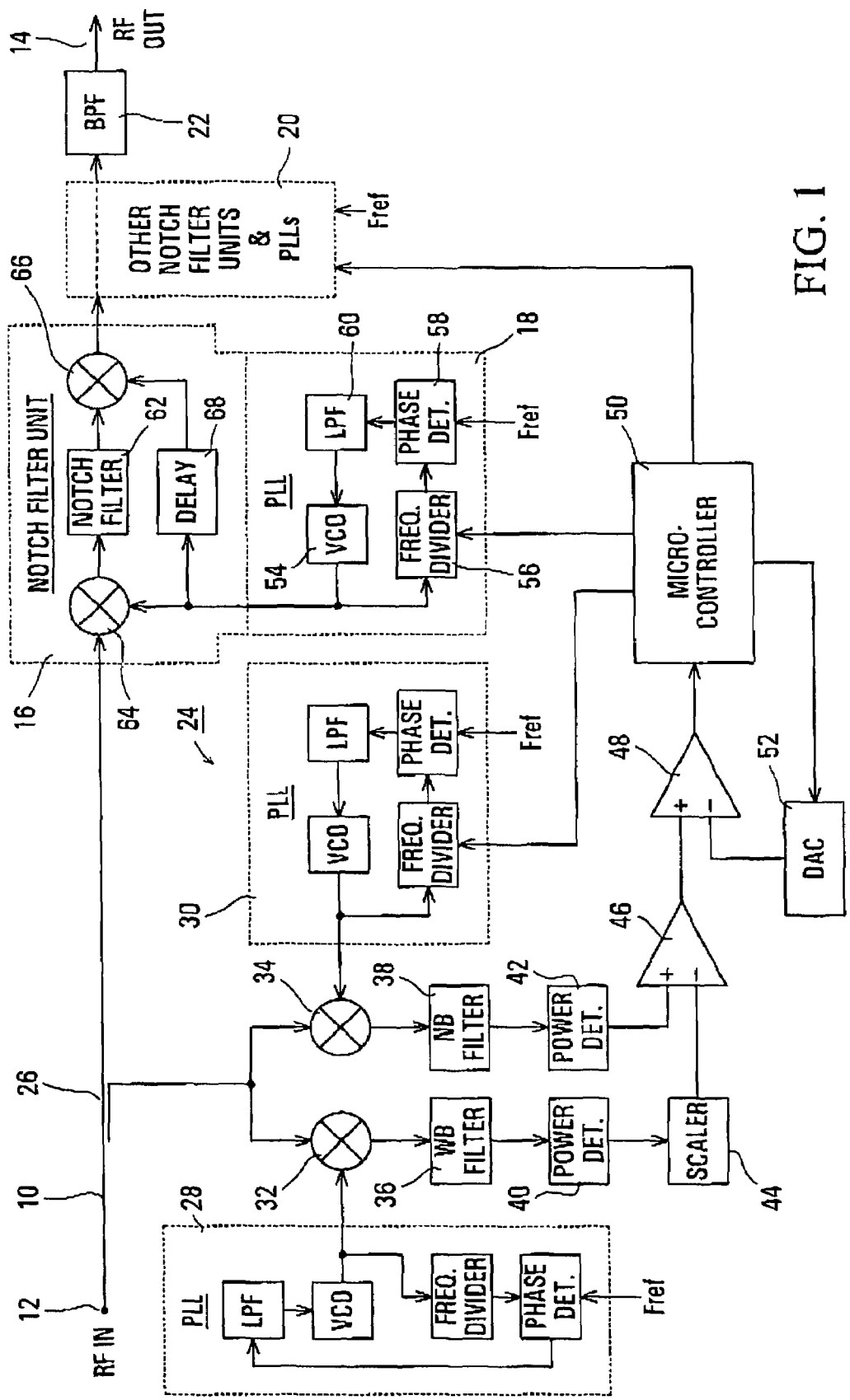
FIG. 1 schematically illustrates an arrangement in accordance with an embodiment of the invention.

An arrangement for reducing narrowband interference in a wideband communications system in accordance with an embodiment of the invention is schematically illustrated in FIG. 1. In this arrangement, by way of example, it is assumed that the communications system is a CDMA wireless system in which the CDMA signal has a bandwidth of 1.28 MHz and a radio frequency (RF) of about 800 MHz. Typically narrowband interference with such a CDMA system is due to signals in narrowband channels of nearby AMPS systems, also at a RF of about 800 MHz and having a channel bandwidth of 30 kHz. Although the arrangement of FIG. 1 is described in the context of these systems, frequencies, and bandwidths, it should be understood that the invention is not limited to these and is applicable to other types of system and interference, and to other signal frequencies and bandwidths.

It can be appreciated that with such systems at least some aspects of the narrowband interference (e.g. channel frequencies and bandwidth) can be known in advance, and this knowledge can be used to advantage as described below (for example, matching the narrowband channel frequencies and bandwidth to those of the likely interference) in facilitating detection and reduction of the interference. However, the invention is also applicable for removing arbitrary or unknown types of interference, characteristics of which may be variable and unknown.

It is desirable for interference to be reduced at an early point in a receive path of the communications system. To this end, the arrangement of FIG. 1 is provided in a receive path 10 for an RF signal of the system passing from an output of a low noise amplifier or LNA (not shown), to which an RF input 12 of the arrangement is coupled, to an RF signal receiver (not shown), to which an RF output 14 of the arrangement is coupled. However, the arrangement of FIG. 1 may instead be provided at other points in a signal receive path.

The arrangement of FIG. 1 provides at least one notch filter unit 16, controlled via a PLL (phase locked loop) 18 constituting a local oscillator (LO), in the receive path 10 between the RF input 12 and output 14. The arrangement may optionally include successively in series in the receive path 10 other, similar, notch filter units and associated PLLs, as indicated by a broken-line box 20. One such notch filter unit and PLL is provided for each narrowband channel for which interference is to be reduced, and a maximum number of notch filter units may be determined by factors such as decreased signal to noise ratio and increased cost. For convenience, the optional additional notch filter units and PLLs 20 are described only later below. The arrangement of FIG. 1 also includes an optional bandpass filter (BPF) 22 in the receive path 10 between the notch filter units and the RF output 14. The BPF 22 has a bandwidth corresponding to that of the CDMA signal (1.28 MHz), and serves to confine the RF output to this signal bandwidth.

The arrangement of FIG. 1 also includes a narrowband interference detection and control arrangement, generally referenced 24, to which a component of the RF input signal on the receive path 10 is supplied via a coupler 26, and which serves to control the notch filter unit 16 via the PLL 18.

The interference detection and control arrangement 24 includes two PLLs 28 and 30, each constituting a respective LO, and associated mixers 32 and 34, respectively, for down-converting the RF signal component as described further below; bandpass filters 36 and 38 for filtering the outputs of the mixers 32 and 34 respectively; power detectors 40 and 42 for determining power of signals at the outputs of the filters 36 and 38 respectively; and a control circuit comprising a scaler 44, a difference amplifier 46, a comparator 48, a micro-controller 50, and a DAC (digital-to-analog converter) 52.

The PLL 18 comprises a voltage controlled oscillator (VCO) 54, a frequency divider 56, a phase detector 58, and a low pass filter (LPF) 60, which are arranged and operate in known manner to provide at the output of the VCO 54 a LO signal at a controlled frequency equal to a reference frequency Fref, supplied to the PLL 18 for example from a crystal controlled oscillator, divided by a frequency division factor of the frequency divider 56. Each other PLL 20, 28, and 30 has a similar form. The frequency division factor of the frequency divider in the PLL 28 is constant; the frequency division factor of the frequency divider in each of the other PLLs 18, 20, and 30 is controlled by the microcontroller 50 via respective control lines as shown in FIG. 1, and these PLLs 18, 20, and 30 are substantially identical to one another.

The notch filter unit 16 comprises a notch filter 62 arranged between two mixers 64 and 66 which perform down-conversion and up-conversion, respectively, of the signal on the receive path 10 between its RF of about 800 MHz and an intermediate frequency (IF), for example about 200 MHz, at which it is convenient to implement the notch filter 62 for example as a surface acoustic wave (SAW) filter. The VCO 54 output signal has a frequency at a difference frequency, for example about 600 MHz, for implementing the conversion by supplying its output directly to the down-converting mixer 64 and via an optional delay unit 68 to the up-converting mixer 66. The delay unit 68 provides a delay for the VCO output signal to match a signal delay via the notch filter 62, and for example can also comprise a SAW device. The bandpass filter 22 eliminates unwanted sidebands, resulting from the conversion processes, from the outgoing RF signal.

In operation of the arrangement of FIG. 1, a component of the RF signal on the receive path 10 derived via the coupler 26 is down-converted by the mixer 32 in accordance with a fixed frequency supplied thereto by the VCO of the PLL 28, to produce an IF signal which is supplied via the bandpass filter 36 to the power detector 40. The filter 36 is a wideband (WB) filter having a bandwidth corresponding to the CDMA signal bandwidth of 1.28 MHz, and accordingly the power detector 40 detects, and produces a voltage proportional to, an average power of the CDMA signal and any interference, over the CDMA signal bandwidth.

The component of the RF signal derived via the coupler 26 is also down-converted by the mixer 34 in accordance with a selected frequency supplied thereto by the VCO of the PLL 30, to produce an IF signal which is supplied via the bandpass filter 38 to the power detector 42. The filter 38 is a narrowband (NB) filter having a bandwidth corresponding, in this example, to the AMPS channel bandwidth of 30 kHz. The microcontroller 50 controls the frequency division factor of the frequency divider in the PLL 30, as described further below, so that the selected frequency of the VCO of the PLL 30 results in a particular selected AMPS channel frequency corresponding to the pass band of the narrowband filter 38. Accordingly, the power detector 42 detects, and produces a voltage proportional to, a power of the CDMA signal and any interference in this 30 kHz channel bandwidth.

The output voltage of the power detector 46 is scaled by the scaler 44 in accordance with the relative bandwidths of the filters 36 and 38, and hence in accordance with the relative signal bandwidths to which the outputs of the power detectors 40 and 42 relate. Thus in this example, with the wideband filter 36 having a bandwidth of 1.28 MHz and the narrowband filter 38 having a bandwidth of 30 kHz, the scaler 44 reduces the output voltage of the power detector 40 by a factor of 30/1280. It can be appreciated that instead the output voltage of the power detector 42 can be scaled up, or a combination of scaling down of the output of the power detector 40 and scaling up of the output of the power detector 42 (part or all of which scaling can be incorporated into the operation of the power detectors themselves) can be used to provide an equivalent result. In any event, resulting outputs from the power detectors 40 and 42, as applied to the amplifier 46 as described below, are scaled in accordance with the wideband and narrowband bandwidths of the filters 36 and 38.

The difference amplifier 46 is supplied with the scaled output voltages from the power detectors and produces an output dependent upon their difference. This is compared in the comparator 48 with a controlled threshold, supplied as a digital signal by the microcontroller 50 and converted into a comparison voltage by the DAC 52, also supplied to the comparator 48; a resulting output of the comparator 48 is supplied to the microcontroller 50.

In one form, the arrangement of FIG. 1 includes the notch filter unit 16 and the associated PLL 18, but does not include any other notch filter units and PLLs 20. The bandpass filter 22 may also be present, or it may be omitted or equivalent filtering may be otherwise provided. In this form, the arrangement serves for notch filtering only one narrowband channel from the RF signal on the receive path 10, this channel being determined as having a greatest level of interference (greatest detected signal power within the narrow channel bandwidth). In the absence of any significant interference being detected in any narrowband channel, the arrangement tunes the notch filter unit 16 to a narrowband channel outside the wideband CDMA signal bandwidth, so that the notch filter unit 16 has very little effect on the CDMA signal on the receive path 10. This avoids the need for bypass switching of the CDMA signal around the notch filter unit 16 in the absence of any narrowband interference.

To reduce interference in each of a plurality of narrowband channels within the CDMA signal bandwidth, a corresponding plurality of separate arrangements each having this same form can be provided in series in the receive path 10, each such arrangement serving in a similar manner to detect and filter out the narrowband channel having a remaining greatest level of interference. Thus a relatively arbitrary number of such arrangements can be provided in the receive path for any particular situation.

Figure 2:
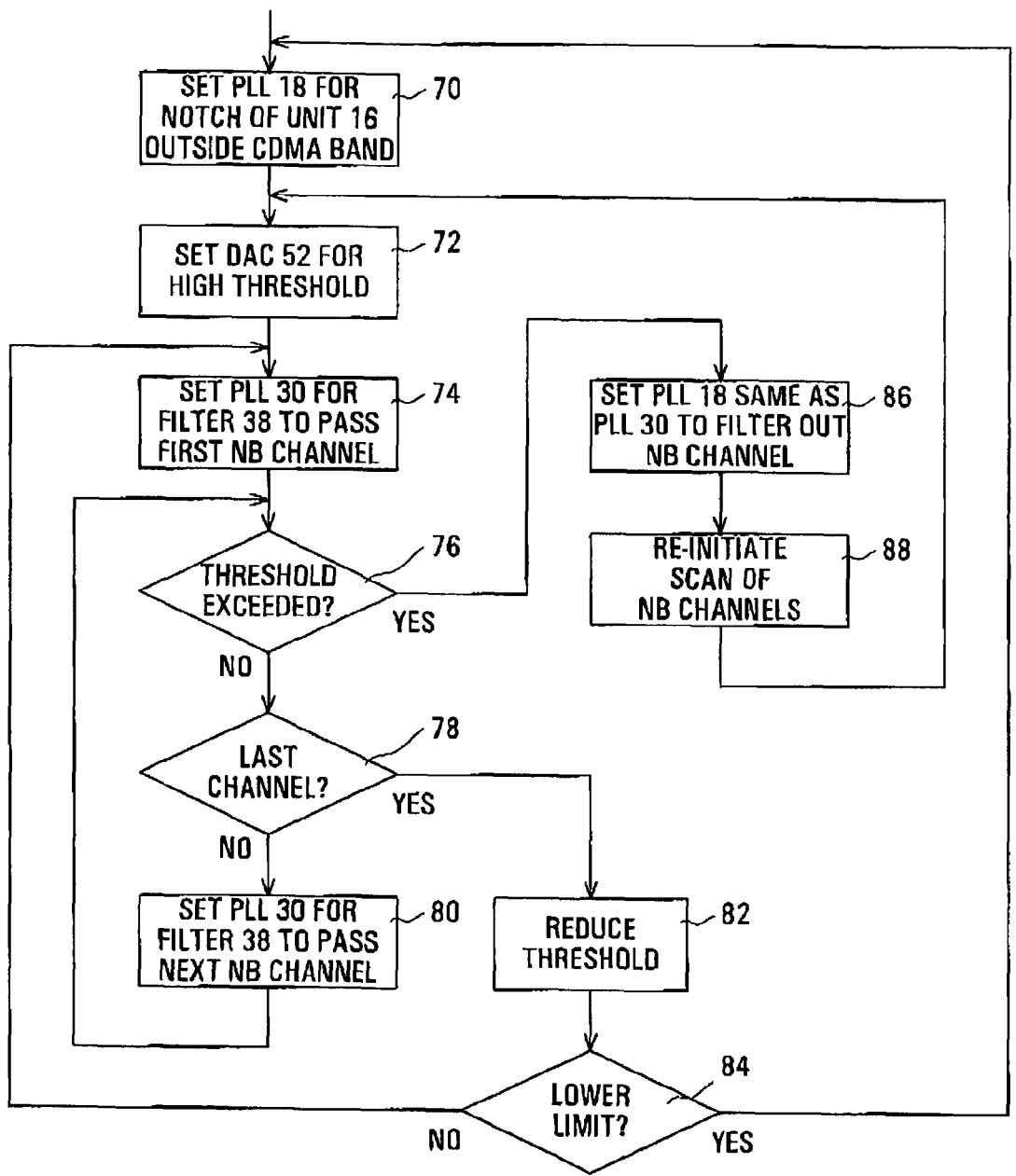
FIG. 2 is a flow chart illustrating operation of a microcontroller of the arrangement of FIG. 1.

In this form, the arrangement of FIG. 1 operates in a manner which is described below and is illustrated by the flow chart of FIG. 2, showing in blocks 70 to 88 functions carried out by or under the control of the microcontroller 50.

Initially, the microcontroller 50 controls (block 70) the frequency divider 56 of the PLL 18 so that the signal frequency of the VCO 54 is such that the entire bandwidth of the CDMA signal on the receive path 10, as down-converted to IF by the mixer 64, is in a pass band of the notch filter, i.e. so that the notch frequency is outside the CDMA signal bandwidth at the IF. Accordingly, the notch filter 62 does not significantly attenuate any part of the wideband CDMA signal, and can remain in the receive path without requiring bypass switching in the absence of narrowband interference.

Via the DAC 52, the microcontroller 50 then sets (block 72) for the comparator 48 a threshold which is sufficiently high that it will not be exceeded for any of the narrowband channels. The microcontroller 50 then (block 74) controls the frequency divider of the PLL 30 so that a first selected narrowband channel within the bandwidth of the wideband CDMA signal is down-converted by the mixer 34 to the pass band of the narrowband filter 38, and its power is detected by the power detector 42.

The microcontroller 50 then determines (block 76) from the comparison by the comparator 48 whether or not the prevailing threshold is exceeded. If not, as is the case for all narrowband channels for the initial high threshold, the microcontroller 50 checks (block 78) whether this is the last channel, and if not selects (block 80) the next narrowband channel (i.e. changes the frequency division factor of the frequency divider in the PLL 30) and loops back to the block 76 to perform a threshold comparison for the next narrowband channel.

On reaching the last of the narrowband channels, as detected in the block 78, without the prevailing threshold having been exceeded, the microcontroller reduces (block 82) the threshold for the comparator 48 via the DAC 52, and checks (block 84) that a lower threshold limit has not been reached. If it has not, it then loops back to the block 74 to repeat the comparison by the comparator 48 with the reduced threshold for each narrowband channel in turn.

If there is at least one narrowband channel containing significant interference, then the progressive reduction of the threshold and comparison with this threshold of the output of the amplifier 46 for each narrowband channel eventually results in a determination in the block 76 that the threshold is exceeded, this occurring for a narrowband channel having a greatest detected signal power. Consequently, the microcontroller 50 supplies (block 86) the frequency divider 56 in the PLL 18 with the same frequency division factor as is currently supplied to the frequency divider in the PLL 30. As the PLLs 18 and 30 are substantially identical to one another, the VCO 54 in the PLL 18 is consequently controlled to supply to the mixer 64 the same frequency as is supplied to the mixer 34 from the VCO of the PLL 30, and the mixer 64 down-converts the receive path signal so that the detected narrowband channel having greatest signal power is at the IF corresponding to the notch frequency of the notch filter 62. This narrowband channel is therefore filtered out of the receive path signal, the remainder of which is up-converted back to RF by the mixer 66.

Subsequently, the microcontroller 50 re-initiates (block 88) the scan of the narrowband channels, returning to the block 72 where via the DAC 52 the comparator threshold is again set to its highest level. The same process is repeated, thereby ensuring that the narrowband interfering channel which is removed by the notch filter unit 16 is always that having the greatest detected signal power, for which the lower threshold limit is exceeded. As long as the detected signal power of the original interfering channel remains the greatest then there is no change of the PLL 18 in the repeated process; if another narrowband channel is found with greater detected signal power, the PLL 18 is similarly controlled at the block 86 so that this new greatest-interference narrowband channel is removed by the notch filter unit 16.

In the event that it is determined in the block 84 that the lower threshold limit has been reached, i.e. that there is no narrowband channel with significant interference to be removed, then a return is made to the block 70 in which the notch frequency is set outside the CDMA signal bandwidth, and the process is repeated.

In this manner, it can be appreciated that this form of the arrangement of FIG. 1 serves to filter out from the wideband CDMA signal on the receive path 10 a narrowband channel for which a detected interference is greatest, to monitor continuing presence of this interference and, in its absence, to adapt to the then greatest interfering narrowband channel, and to tune the notch filter 62 to a frequency outside the signal bandwidth in the event that there is no narrowband interference channel to be filtered. Each of a plurality of such arrangements, in cascade in the receive path, can operate independently to filter out a respective one of a plurality of narrowband interference channels.

It can be appreciated that the flow chart of FIG. 2 and the above description of operation are provided only by way of example, and that changes can be made to suit particular requirements.

In an alternative form of the arrangement of FIG. 1, one or more other notch filter units and PLLs 20, similar to the notch filter unit 16 and PLL 18, are provided in the arrangement as illustrated in FIG. 1, with each other PLL being controlled by the microcontroller 50, in a similar manner to that described above for the PLL 18, to tune the respective other notch filter unit to filter out a respective narrowband channel to reduce interference in that channel, or to tune the respective notch frequency outside the CDMA bandwidth in the event that no further narrowband interference is to be filtered out. In this alternative form of the arrangement, the operation of the microcontroller 50 is similar to that described above with respect to FIG. 2, except that the various steps are repeated for each of the other notch filter units and PLLs 20 to tune each notch filter for a respective narrowband channel (within or outside the CDMA signal bandwidth as described above). In this manner, an arrangement in accordance with FIG. 1 and having a plurality of N notch filter units can be used to filter out, and hence reduce interference for, any number, up to N, of narrowband channels, with the narrowband interference detection and control arrangement 24 being provided in common for all of the N notch filter units and their associated PLLs.

Although as described above it is assumed that the narrowband channels are selected to be 30 kHz channels to match the bandwidth of AMPS signals which are likely interferers for a CDMA system, it can be appreciated that other narrowband interference, having a known bandwidth or not, can be removed in a similar manner, the bandwidths of the filter 38 and each notch filter 62 being selected as may be desired, narrower bandwidths of the notch filters requiring a greater number of notch filters to be used to remove interference within a given part of the wideband signal spectrum.

In addition, although as described above the wideband signal is a CDMA signal at RF, this need not be the case. The wideband signal may be any type of signal in any frequency range. The arrangement of FIG. 1 uses frequency conversion from RF to IF for convenient implementation of the filters 36, 38, and 62, this also providing a convenient manner of tuning the filters 38 and 62 to the respective narrowband channels. For other signal frequencies the frequency conversions between RF and IF signals can be omitted, and the filters 38 and 62 can be otherwise tuned to the respective narrowband channels to directly filter the wideband signal in which narrowband interference is to be reduced.

It can also be appreciated that, as the wideband filter 36 has a much greater bandwidth than the narrowband and notch filters 38 and 62, and operates at a fixed frequency, it may be convenient for the wideband filter 36 to be implemented as an RF filter operating directly on the RF signal from the coupler 26, thereby eliminating any need for the PLL 28 and mixer 32, with the other filters operating on IF signals down-converted as described above.

It can be appreciated that the arrangement as described above provides a particularly convenient apparatus for reducing narrowband interference in CDMA signals, as it can be deployed in the RF receive signal path of CDMA base stations in a selective manner only to the extent that it is needed for reducing interference, without requiring any change in the remainder of the CDMA base station.

Although particular embodiments of the invention are described above in detail, it can be appreciated that numerous modifications, variations, and adaptations may be made without departing from the scope of the invention as defined in the claims.

The invention claimed is:

1. An arrangement for reducing narrowband interference in a wideband signal, comprising:
    a first power detector for producing a first power signal representing power of the wideband signal over a bandwidth of the wideband signal;
    a selector for selecting any one of a plurality of narrowband parts of the wideband signal;
    a second power detector for producing a second power signal representing power of a narrowband part of the wideband signal selected by the selector;
    a filter for filtering the wideband signal to remove therefrom a selected narrowband part of the wideband signal; and
    a control circuit responsive to the first and second power signals, scaled in accordance with the wideband and narrowband bandwidths, to detect interference in the narrowband part of the wideband signal selected by the selector and, in response to such detection, to control the filter to select said narrowband part of the wideband signal selected by the selector thereby to reduce said interference.

2. An arrangement as claimed in claim 1 wherein the selector comprises a narrowband filter for selecting any one of a plurality of narrowband parts of the wideband signal under the control of the control circuit.

3. An arrangement as claimed in claim 1 wherein the selector comprises a local oscillator (LO) controlled by the control circuit to produce an LO signal at any one of a plurality of frequencies, a mixer responsive to the wideband signal and the LO signal to produce a frequency difference signal, and a narrowband filter for filtering the frequency difference signal.

4. An arrangement as claimed in claim 3 wherein the LO comprises a phase locked loop including a frequency divider having a frequency division factor controlled by the control circuit.

5. An arrangement as claimed in claim 3 wherein the filter for filtering the wideband signal to remove therefrom a selected narrowband part of the wideband signal comprises a second LO controlled by the control circuit to produce a second LO signal at any one of a plurality of frequencies, a second mixer responsive to the wideband signal and the second LO signal to produce a second frequency difference signal, and a notch filter for filtering the second frequency difference signal to remove therefrom a selected narrowband part of the second frequency difference signal thereby to produce a notch filtered signal.

6. An arrangement as claimed in claim 5 wherein the filter for filtering the wideband signal further comprises a third mixer responsive to the notch filtered signal and the second LO signal to produce a frequency sum signal constituting the wideband signal with reduced narrowband interference.

7. An arrangement as claimed in claim 5 wherein the second LO comprises a phase locked loop including a frequency divider having a frequency division factor controlled by the control circuit.

8. An arrangement as claimed in claim 5 and including a wideband filter, having a pass band corresponding co the bandwidth of the wideband signal, via which the wideband signal is coupled to the first power detector.

9. An arrangement as claimed in claim 8 and further comprising a third LO, for producing a third LO signal at a predetermined frequency, and a further mixer responsive to the wideband signal and the third LO signal to produce a third frequency difference signal, the wideband filter being arranged for filtering the third frequency difference signal.

10. An arrangement as claimed in claim 5 wherein the control circuit is responsive to the first and second power signals to control the second LO, in the absence of detected interference in any of said plurality of narrowband parts of the wideband signal, so that the notch filter filters a narrowband part of the second frequency difference signal outside a frequency band of the second frequency difference signal corresponding to the wideband signal.

11. An arrangement as claimed in claim 1 wherein the control circuit is responsive to the first and second power signals to control the filter, in the absence of detected interference in any of said plurality of narrowband parts of the wideband signal, so that the selected narrowband part of the wideband signal is outside the bandwidth of the wideband signal.

12. Apparatus for reducing narrowband interference in a wideband radio frequency (RF) signal of a CDMA communications system, comprising:
    a notch filter unit comprising a first down-converter for converting the RF signal to an intermediate frequency (IF) signal, a notch filter for filtering to remove a narrowband part of the IF signal, and an up-converter for converting the filtered IF signal to an RF signal;
    a control circuit;
    a first local oscillator (LO) for supplying to the first down-converter and to the up-converter of the notch filter unit a LO signal having a frequency controlled by the control circuit so that said narrowband part of the IF signal removed by the notch filter corresponds to any one of a plurality of narrowband channels within a bandwidth of the RF signal; and
    a second down-converter, a second local oscillator controlled by the control circuit, and a narrowband filter for producing from the RF signal an IF signal having a narrow bandwidth corresponding to any one of said plurality of narrowband channels;

wherein the control circuit includes a power detector for determining power of said IF signal having a narrow bandwidth, the control circuit being responsive to the determined power of said IF signal, relative to a determined power of the wideband RF signal and scaled in accordance with the wideband and narrowband bandwidths of said signals, to detect narrowband interference in the wideband RF signal and, in response to such detection, to control the first LO so that the narrowband part of the wideband signal removed by the notch filter contains said interference.

13. Apparatus as claimed in claim 12 and including a third down-converter, a third local oscillator, and a wideband filter for producing from the RF signal an IF signal having a wide bandwidth corresponding to the bandwidth of the RF signal; and a second power detector for determining power of said IF signal having a wide bandwidth thereby to determine the power of the wideband RF signal.

14. Apparatus as claimed in claim 12 and including a plurality of said notch filter units coupled in cascade, and a plurality of said first LOs each associated with a respective one of the notch filter units, each of the plurality of said first LOs being controlled by the control circuit so that the associated notch filter unit can filter a respective one of said plurality of narrowband channels within the bandwidth of the RF signal.

15. Apparatus as claimed in claim 12 wherein the control circuit is responsive to an absence of detected narrowband interference in the wideband RF signal to control the first LO so that the narrowband part of the wideband signal removed by the notch filter is outside a bandwidth of the IF signal corresponding to said wideband bandwidth of the RF signal.

16. A method of detecting and reducing narrowband interference in a wideband signal, comprising the steps of:

for each of a plurality of narrowband channels within a bandwidth of the wideband signal, determining a power of the signal within the narrowband channel relative to a power of the wideband signal, scaled in accordance with the wideband and narrowband bandwidths, and comparing the determined power with a threshold thereby to detect interference in the narrowband channel;

decreasing the threshold from a relatively high level thereby to determine a narrowband channel having a greatest interference; and filtering the determined narrowband channel having the greatest interference from the wideband signal thereby to reduce said interference in the wideband signal.

17. A method as claimed in claim 16 wherein the wideband signal is a radio frequency (RF) signal, the method further comprising the step of down-converting the wideband signal to an intermediate frequency (IF) for the steps of determining power and filtering.

18. A method as claimed in claim 17 wherein, in response to the threshold being decreased to a lower limit before detection of said narrowband channel having a greatest interference, the step of filtering comprises filtering from the wideband signal a narrowband channel outside the bandwidth of the wideband signal.

19. A method as claimed in claim 16 wherein, in response to the threshold being decreased to a lower limit before detection of said narrowband channel having a greatest interference, the step of filtering comprises filtering from the wideband signal a narrowband channel outside the bandwidth of the wideband signal.

\* \* \* \* \*

UNITED STATES PATENT AND TRADEMARK OFFICE
CERTIFICATE OF CORRECTION

| | | |
|---|---|---|
| PATENT NO. | : 7,194,050 B2 | Page 1 of 1 |
| APPLICATION NO. | : 10/259891 | |
| DATED | : March 20, 2007 | |
| INVENTOR(S) | : Charles T. Nicholls et al. | |

It is certified that error appears in the above-identified patent and that said Letters Patent is hereby corrected as shown below:

Column 10, Claim 8, line 26, "co" should be corrected to read -- to --

Signed and Sealed this

Twenty-fifth Day of September, 2007

JON W. DUDAS
*Director of the United States Patent and Trademark Office*